Figure 1:
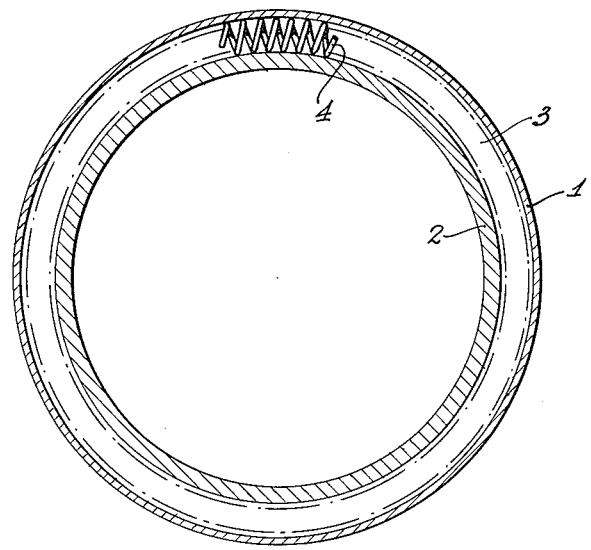

Oct. 8, 1963 W. A. WOLFE ETAL 3,106,520

CONCENTRIC TUBE STRUCTURE

Filed Feb. 9, 1961

INVENTOR
William A. Wolfe
Liberty Pease
BY Harold G. Wein

PATENT AGENT

3,106,520
CONCENTRIC TUBE STRUCTURE
William A. Wolfe, Vancouver, British Columbia, and
  Liberty Pease, Oakville, Ontario, Canada, assignors to
  Atomic Energy of Canada Limited, Ottawa, Ontario,
  Canada, a corporation
    Filed Feb. 9, 1961, Ser. No. 88,089
        1 Claim. (Cl. 204—193.2)

This invention relates to a concentric tube structure having relatively movable concentric tubes and a spacer spring support therefor.

It is sometimes desirable to provide a support for spacing two concentrically tubes which will permit relative axial movement of one or other of the tubes. For instance, in nuclear reactors, it is desirable to provide an annular space between the pressure tube and the calandria to permit free passage of cooling and purging fluid in the annular space. Since, in operation, there is relative axial movement between the pressure and calandria, it is very difficult to provide satisfactory spacing means between these tubes while utilizing such spacing means as an adequate support to permit the desired relative movement. It will be apparent that, in nuclear reactors, it is highly desirable that the spacing means be of a material and/or size such as to limit to a satisfactory degree neutron absorption.

It is an object of this invention to provide a concentric tube structure having means for spacing two concentric tubes in adequately supported relation to provide an annular space therebetween while permitting relative axial movement of the tubes.

A more specific object is to provide, in nuclear reactors, means for inhibiting wear and galling due to the relative movement of the hot pressure tube with respect to the cool calandria tube, and for permitting passage of cooling and purging gas between the tubes.

The invention generally contemplates the provision of a concentric tube structure comprising a pair of concentric tubes arranged for relative axial movement, and an endless garter spring constituting a spacer between and engaging said tubes, said spring being in disconnected relation to said tubes.

The invention will be described with reference to the accompanying drawing, in which FIGURE 1 is an end elevation of a concentric tube structure in accordance with the invention.

In the drawing, 1 is a tube which may be the calandria tube of a nuclear reactor, and 2 is a tube, which may be the pressure tube of a nuclear reactor, concentrically arranged therein, and mounted for relative axial movement.

In accordance with the invention, the tubes are of relative diameters which permit the formation of an annular space 3 between the tubes as by means of a spacer comprising a garter spring 4. The spring 4 is of endless type having its convolutions substantially uniformly arranged and in engagement with the walls of the tubes.

The spring 4 is freely seated between the tubes, i.e., it is unattached to either tube whereby it permits axial movement of the tube 2 relative to the tube 1 by rolling movement of the spring on the tube walls.

It is contemplated that, in some installations, the rolling action of the spring will wear a seat for itself in one or other of the tubes, such seat tending to provide a positive locating means for the spring during subsequent operation.

Examples of satisfactory materials from which the spring spacer in accordance with the invention may be formed, and particularly for use in a nuclear reactor, are those known under the trade names "Zircaloy," "Zircaloy 2" and "Inconel X."

In early tests with the pressure tube and aluminum calandria tube using a "Zircaloy" spring having a wire diameter of .030 inch and outside diameter of .185–.200 inch, 16 turns per inch, and the length of 12½ inches, after 4,000 cycles of .20 inch. Longitudinal movement with the spring at 530° F. and two springs supporting a total load of 300 pounds, the surface of the pressure tube was undamaged and the surface of the calandria tube showed markings from the spring coils that are estimated to be .001–.003 inch deep, or less.

Other springs of suitable geometry for use in accordance with the invention are "Inconel X" having a cross section .020″ wide and .040″ deep (rectangular) and "Zircaloy 2" having a cross section .020″ wide and .050″ deep (rectangular).

Various additional tests have shown that a spring such as described will function in the manner set forth for a satisfactory period without failure.

It will be apparent that the use of a spring rather than rigid spacing means substantially reduces the weight of material required and at the same time provides a substantially uninterrupted annulus for passage of cooling and purging gas therethrough.

We claim:

In a nuclear reactor having a calandria tube and a pressure tube concentrically arranged therein, spacer means therefor comprising an endless cylindrical helical spring interposed between said tubes and having each of its convolutions in engagement with the walls of said tubes to provide a substantially uninterrupted annular space between said tubes, said spring being in disconnected relation to said tubes and thereby being subject to rolling movement with respect to said tubes in response to axial movement of one of said tubes relative to the other.

References Cited in the file of this patent
UNITED STATES PATENTS

| | | |
|---|---|---|
| 2,525,730 | Schulze | Oct. 10, 1950 |
| 2,537,024 | Bay | Jan. 9, 1951 |
| 2,832,733 | Szilard | Apr. 29, 1958 |
| 2,863,817 | Morris | Dec. 9, 1958 |
| 2,875,987 | La Valley | Mar. 3, 1959 |
| 2,915,446 | Liljeblad | Dec. 1, 1959 |